US010515635B2

United States Patent
Horling et al.

(10) Patent No.: US 10,515,635 B2
(45) Date of Patent: *Dec. 24, 2019

(54) FORMING CHATBOT OUTPUT BASED ON USER STATE

(71) Applicant: Google LLC, Mountain View, CA (US)

(72) Inventors: Bryan Horling, Belmont, MA (US); David Kogan, Natick, MA (US); Maryam Garrett, Cambridge, MA (US); Daniel Kunkle, Boston, MA (US); Wan Fen Nicole Quah, Cambridge, MA (US); Ruijie He, Roxbury Crossing, MA (US); Wangqing Yuan, Wilmington, MA (US); Wei Chen, Belmont, MA (US); Michael Itz, Somerville, MA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/181,874

(22) Filed: Nov. 6, 2018

(65) Prior Publication Data

US 2019/0074010 A1    Mar. 7, 2019

Related U.S. Application Data

(63) Continuation of application No. 15/915,599, filed on Mar. 8, 2018, now Pat. No. 10,157,615, which is a (Continued)

(51) Int. Cl.
*G10L 15/22* (2006.01)
*G06F 16/9535* (2019.01)
(Continued)

(52) U.S. Cl.
CPC .......... *G10L 15/22* (2013.01); *G06F 16/9535* (2019.01); *G10L 15/1815* (2013.01); *G10L 15/30* (2013.01); *G10L 15/26* (2013.01)

(58) Field of Classification Search
CPC .. G06F 17/279; G06F 19/3418; G06F 17/274; G06F 17/2785; G06F 19/36;
(Continued)

(56) References Cited

U.S. PATENT DOCUMENTS

2003/0212546 A1* 11/2003 Shaw .................... G06F 17/279
704/9
2008/0147407 A1   6/2008 Da Palma et al.
(Continued)

OTHER PUBLICATIONS

Bunardzic, A. "Four Types of Bots—Chatbots Magazine". ChatBots Magazine.com; May 17, 2016; 6 pages.
(Continued)

*Primary Examiner* — Huyen X Vo
(74) *Attorney, Agent, or Firm* — Middleton Reutlinger

(57) ABSTRACT

Techniques are described herein for chatbots to achieve greater social grace by tracking users' states and providing corresponding dialog. In various implementations, input may be received from a user at a client device operating a chatbot, e.g., during a first session between the user and the chatbot. The input may be semantically processed to determine a state expressed by the user to the chatbot. An indication of the state expressed by the user may be stored in memory for future use by the chatbot. It may then be determined, e.g., by the chatbot based on various signals, that a second session between the user and the chatbot is underway. In various implementations, as part of the second session, the chatbot may output a statement formed from a plurality of candidate words, phrases, and/or statements based on the stored indication of the state expressed by the user.

20 Claims, 5 Drawing Sheets

Related U.S. Application Data continuation of application No. 15/277,954, filed on Sep. 27, 2016, now Pat. No. 9,947,319.

(51) Int. Cl.
*G10L 15/18* (2013.01)
*G10L 15/30* (2013.01)
*G10L 15/26* (2006.01)

(58) Field of Classification Search
CPC ............ G06F 11/0709; G06F 11/3006; G06F 16/90332; G06F 16/907; G06F 17/28; G06F 16/00; G06F 16/24575
See application file for complete search history.

(56) References Cited

U.S. PATENT DOCUMENTS

2014/0279050 A1    9/2014  Makar et al.
2017/0054848 A1*   2/2017  Meng ................... G06Q 30/02

OTHER PUBLICATIONS

Bunardzic, A. "How to Build a Stateful Bot", Retrieved from Internet: URL:https://medium.com/bots-for-business/how-to-build-a-stateful-bot-a2703ff2d57b [retrieved Nov. 6, 2017], pp. 1-8, Jul. 13, 2016.
Balena, F. "Web Services" in "Programming Microsoft Visual Basic.Net"; May 17, 2002, Microsoft Press, Redmond, WA; ISBN: 978-0-7356-1375-1; pp. 1086-1125.
International Search Report and Written Opinion of PCT Ser. No. PCT/US2017/050297; 15 pages dated Nov. 16, 2017.
United Kingdom Intellectual Property Office; Examination Report issued in Application No. 1713939.5 dated Mar. 14, 2018.
European Patent Office; Written Opinion of the International Preliminary Examining Authority for PCT Ser. No. PCT/US2017/050297, dated Aug. 28, 2018; 11 pages.
International Bureau of WIPO; International Preliminary Report on Patentability of Ser. No. PCT/US2017/050297; 11 pages; dated Apr. 11, 2019.

* cited by examiner

FORMING CHATBOT OUTPUT BASED ON USER STATE

BACKGROUND

Chatbots, also referred to as "interactive assistant modules," "virtual assistants," and/or "mobile assistants," may be designed to mimic human conversation. For example, a chatbot may greet a user with conversational statements such as "hello" and "how are you today?" Some chatbots may even be configured to identify a state associated with a user statement and respond accordingly. Suppose a user tells a chatbot, "I feel lousy today." The chatbot may detect the negative state expressed by the user and may select and output an appropriate response, such as "I'm sorry to hear that." In spite of efforts to make chatbots seem more "human," however, chatbots may still tend to come off as unnatural or awkward because, for instance, they do not keep track of users' emotional states over time.

SUMMARY

This specification is directed generally to various techniques for tailoring chatbot output to a user's state in order to achieve more natural dialog. As used herein, a user's "state" may refer to a particular condition of the user (at that time or at a previous time) or of another being (e.g., the user's friend/family member/pet), such as an emotional and/or physical condition (e.g., a sentiment of the user). In various implementations, a client device such as a smart phone, smart watch, standalone voice-activated product, or a vehicle computing system (e.g., a vehicle navigation or media management system) that operates a chatbot may receive input from the user. The input may arrive during a first "session" between the user and the chatbot in various forms, including but not limited to spoken or voice input, typed input, gesture input, eye movement input, facial expression input, and so forth. The chatbot may semantically process the input to determine a state of the user (e.g., sentiment) expressed by the user, and may store an indication of the state of the user for later use. For example, suppose during a first session a user indicates a negative state, e.g., by saying, "I feel lousy," or by making a facial expression associated with negativity (e.g., frowning, grimacing, etc.). The chatbot may detect and retain in memory an indication of the user's negative state, such as the user's actual statement and/or a sentiment measure. During a subsequent session with the user, the chatbot may form, e.g., from one or more candidate words, phrases, or statements, one or more statements (e.g., empathetic statements such as "I hope you're feeling better," "I hope your dog is feeling better," or inquiries such as "are you feeling better?," etc.) to output to the user based on the stored user state indication. In this manner, the chatbot is able to retain knowledge of the user's state over time, and is able to engage the user in a more socially reasonable manner.

A "session" may include a logically and/or temporally self-contained exchange of one or more messages between the user and the chatbot. A chatbot may distinguish between multiple sessions with a user based on one or more signals, such as passage of time (e.g., a predetermined time interval) between sessions, change of user context (e.g., location, before/during/after a scheduled meeting, etc.) between sessions, detection of one or more intervening interactions between the user and the client device other than dialog between the user and the chatbot (e.g., the user switches applications for a while, the user walks away from then later returns to a standalone voice-activated product), locking/sleeping of the client device between sessions, and so forth. In some implementations, a chatbot may track a user's state over more than two sessions. For example, a chatbot may learn that at particular times of particular days each week (or month, or year), a user tends to have a particular user state. The chatbot may proactively output statements that are targeted towards these learned user states, giving the chatbot the appearance of empathy.

Techniques described herein may give rise to various technical effects and advantages. For example, the more empathetic (and hence, more "human") a chatbot appears, the more likely a user may be to converse with it in the future. The more a user utilizes a chatbot, the more the chatbot may be able to learn about the user and the user's lifestyle/interactions. Consequently, the chatbot may be able to make more intelligent recommendations and provide more useful assistance in the future, increasing the chatbot's overall efficiency and conserving computing resources such as memory, power, processor cycles, and/or network bandwidth. Moreover, tracking a state of a user may yield more efficient dialog between the user and the chatbot, likewise decreasing the consumption of computing resources. For example, if a chatbot issues a statement that reflects a user's previous state, the user may immediately issue directed requests to the chatbot, without the user having to remind the chatbot of the user's state.

Chatbots may output statements obtained from various sources. In some implementations, the chatbot may have access to a library of statements extracted from prior message exchange threads between multiple participants (assuming, of course, the prior message exchange threads were authorized for such use). In some implementations, the chatbot may map one or more user states (e.g., sentiments) to groups of statements from the library, e.g., using heuristics. In some implementations, the chatbot may utilize a machine learning classifier that is trained based at least in part on pairs of participant statements expressing sentiment and participant responses to those statements of sentiment extracted from the prior message exchange threads.

Therefore, in some implementations, a method may include: receiving, at a client device operating a chatbot, input from a user, wherein the input is received during a first session between the user and the chatbot, and the input is based on user interface input generated by the user via one or more input devices of the client device; semantically processing, by the chatbot, the input from the user to determine a state expressed by the user to the chatbot; storing, by the chatbot, an indication of the state expressed by the user in memory for future use by the chatbot; determining, by the chatbot based on one or more signals, that a second session between the user and the chatbot is underway; and outputting, by the chatbot, as part of the second session, a statement formed from a plurality of candidate words, phrases, or statements based on the stored indication of the state expressed by the user, wherein the statement is output to the user via one or more output devices of the client device.

In various implementations, the determining may include determining that the second session has commenced. In various implementations, the statement formed from the plurality of candidate words, phrases, or statements may be a greeting selected from a plurality of candidate greetings. In various implementations, the state expressed by the user may be a negative sentiment, and the statement formed from the plurality of candidate words, phrases, or statements may include an inquiry of whether the user or other individual about which the state was expressed has improved.

In various implementations, the method may further include: receiving, at the client device, voice input from the user; and converting the voice input into textual input. In various implementations, the statement may be formed remotely from the client device or locally by the chatbot. In various implementations, the method may further include outputting, by the chatbot during the first session in response to the input from the user, a response selected from a plurality of candidate responses based on the state expressed by the user. In various implementations, the state expressed by the user may be a negative sentiment, and the response selected from the plurality of candidate responses may include an empathetic statement.

In various implementations, the one or more signals may include detection of one or more intervening interactions between the user and the client device other than dialog between the user and the chatbot. In various implementations, the one or more signals may include passage of a predetermined time interval since a last interaction between the user and the chatbot. In various implementations, the one or more signals may include detection of a change in a context of the user since a last interaction between the user and the chatbot.

In various implementations, the chatbot may obtain the plurality of candidate words, phrases, or statements from prior message exchange threads between multiple individuals. In various implementations, the statement may be formed based on a machine learning classifier trained based at least in part on the prior message exchange threads.

In various implementations, the storing may include storing the textual user input in a sequence of user inputs that include states expressed by the user over time. In various implementations, the statement may be formed further based on a change of context of the user detected by the client device between the first session and the second session. In various implementations, the state expressed by the user may be a sentiment of the user.

In addition, some implementations include an apparatus including memory and one or more processors operable to execute instructions stored in the memory, where the instructions are configured to perform any of the aforementioned methods. Some implementations also include a non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
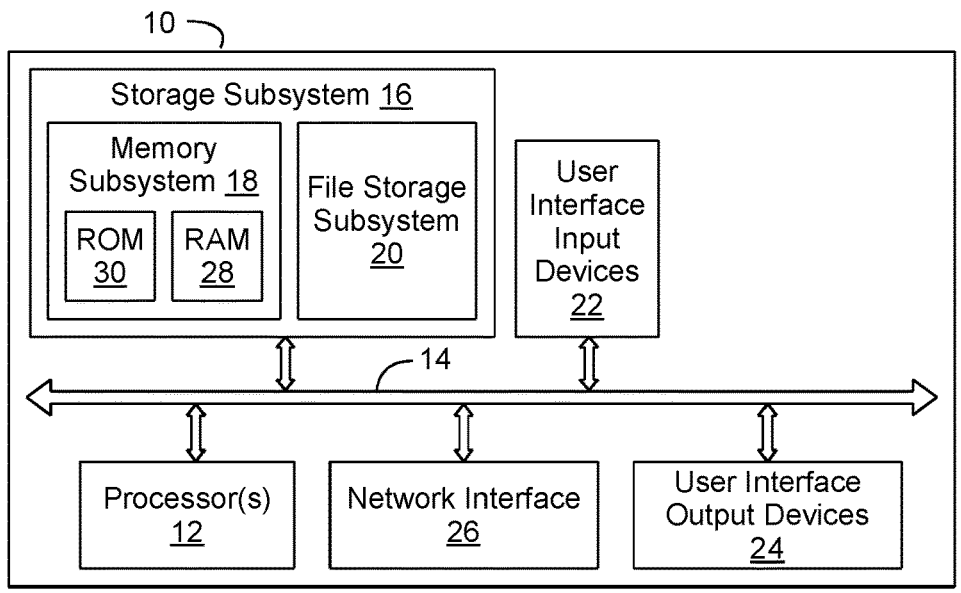
FIG. 1 illustrates an example architecture of a computer system.

This specification is directed generally to various techniques for tailoring chatbot output to a user's state to achieve more natural dialog. In various implementations, a client device such as a smart phone, smart watch, standalone voice-activated product, or a vehicle computing system (e.g., a vehicle navigation or media management system) that operates a chatbot may receive input from the user. The input may arrive during a first "session" between the user and the chatbot in various forms using various modalities, such as spoken or typed input, gesture input, facial expression of the user, eye movements, and so forth. If the input is received as voice input, it may first be parsed and tokenized into text tokens as described below. Accordingly, as used herein, "textual input" includes both voice input (that is ultimately converted to text) and input that a user types using a virtual or physical keyboard. The chatbot may semantically process the textual input to determine a state (e.g., sentiment) expressed by the user (which may relate to the user or to someone else, such as the user's family member/friend/pet/co-worker), and may store an indication of the state for later use. For example, if during a first session a user says, "I feel lousy," the chatbot may retain in memory an indication of the user's sentiment, such as the user's statement itself. During a subsequent session with the user, the chatbot may form one or more statements (e.g., empathetic statements such as "I hope you're feeling better," "I hope your family is feeling better," or inquiries such as "are you feeling better?," etc.) to output to the user via one or more output devices. In this manner, the chatbot is able to retain knowledge of states expressed by the user over time (about the user and/or others), and is able to engage the user in a more socially reasonable manner.

A "session" may include a logically and/or temporally self-contained exchange of one or more messages between the user and the chatbot. A chatbot may distinguish between multiple sessions with a user based on one or more signals, such as passage of time between sessions, change of user context (e.g., location, before/during/after a scheduled meeting, etc.) between sessions, detection of one or more intervening interactions between the user and the client device other than dialog between the user and the chatbot (e.g., the user switches applications for a while, the user walks away from then later returns to a standalone voice-activated product), locking/sleeping of the client device between sessions, and so forth.

In some implementations, a chatbot may track states expressed by a user over more than two sessions. For example, a chatbot may learn that at particular times of particular days each week (or month, or year), a user (or someone whom the user knows) tends to have a particular state. The chatbot may proactively output statements that are targeted towards learned states, giving the chatbot the appearance of empathy. For example, suppose a user indicates a romantic sentiment to a chatbot every year around the user's wedding anniversary. The chatbot may proactively issue statements leading up to the user's anniversary that put the user in a romantic state of mind (e.g., "Remember how smitten you were this time last year?").

Further details regarding selected implementations are discussed hereinafter. It will be appreciated however that other implementations are contemplated so the implementations disclosed herein are not exclusive.

Now turning to the drawings, wherein like numbers denote like parts throughout the several views, FIG. 1 is a block diagram of electronic components in an example computer system 10. System 10 typically includes at least one processor 12 that communicates with a number of peripheral devices via bus subsystem 14. These peripheral devices may include a storage subsystem 16, including, for example, a memory subsystem 18 and a file storage subsystem 20, user interface input devices 22, user interface output devices 24, and a network interface subsystem 26. The input and output devices allow user interaction with system 10. Network interface subsystem 26 provides an interface to outside networks and is coupled to corresponding interface devices in other computer systems.

In some implementations, user interface input devices 22 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 10 or onto a communication network.

User interface output devices 24 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual output such as audio output. In general, use of the term "output device" is intended to include all possible types of devices and ways to output information from computer system 10 to the user or to another machine or computer system.

Storage subsystem 16 stores programming and data constructs that provide the functionality of some or all of the modules described herein. For example, the storage subsystem 16 may include the logic to perform selected aspects of the methods disclosed hereinafter.

These software modules are generally executed by processor 12 alone or in combination with other processors. Memory subsystem 18 used in storage subsystem 16 may include a number of memories including a main random access memory (RAM) 28 for storage of instructions and data during program execution and a read only memory (ROM) 30 in which fixed instructions are stored. A file storage subsystem 20 may provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 20 in the storage subsystem 16, or in other machines accessible by the processor(s) 12.

Bus subsystem 14 provides a mechanism for allowing the various components and subsystems of system 10 to communicate with each other as intended. Although bus subsystem 14 is shown schematically as a single bus, alternative implementations of the bus subsystem may use multiple busses.

System 10 may be of varying types including a mobile device, a portable electronic device, an embedded device, a standalone voice-activated product, a vehicle computing system (e.g., a vehicle navigation or media management system), a desktop computer, a laptop computer, a tablet computer, a wearable device, a workstation, a server, a computing cluster, a blade server, a server farm, or any other data processing system or computing device. In addition, functionality implemented by system 10 may be distributed among multiple systems interconnected with one another over one or more networks, e.g., in a client-server, peer-to-peer, or other networking arrangement. Due to the ever-changing nature of computers and networks, the description of system 10 depicted in FIG. 1 is intended only as a specific example for purposes of illustrating some implementations. Many other configurations of system 10 are possible having more or fewer components than the computer system depicted in FIG. 1.

Implementations discussed hereinafter may include one or more methods implementing various combinations of the functionality disclosed herein. Other implementations may include a non-transitory computer readable storage medium storing instructions executable by a processor to perform a method such as one or more of the methods described herein. Still other implementations may include an apparatus including memory and one or more processors operable to execute instructions, stored in the memory, to perform a method such as one or more of the methods described herein.

Various program code described hereinafter may be identified based upon the application within which it is implemented in a specific implementation. However, it should be appreciated that any particular program nomenclature that follows is used merely for convenience. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that some implementations may not be limited to the specific organization and allocation of program functionality described herein.

Furthermore, it will be appreciated that the various operations described herein that may be performed by any program code, or performed in any routines, workflows, or the like, may be combined, split, reordered, omitted, performed sequentially or in parallel and/or supplemented with other techniques, and therefore, some implementations are not limited to the particular sequences of operations described herein.

Figure 2:
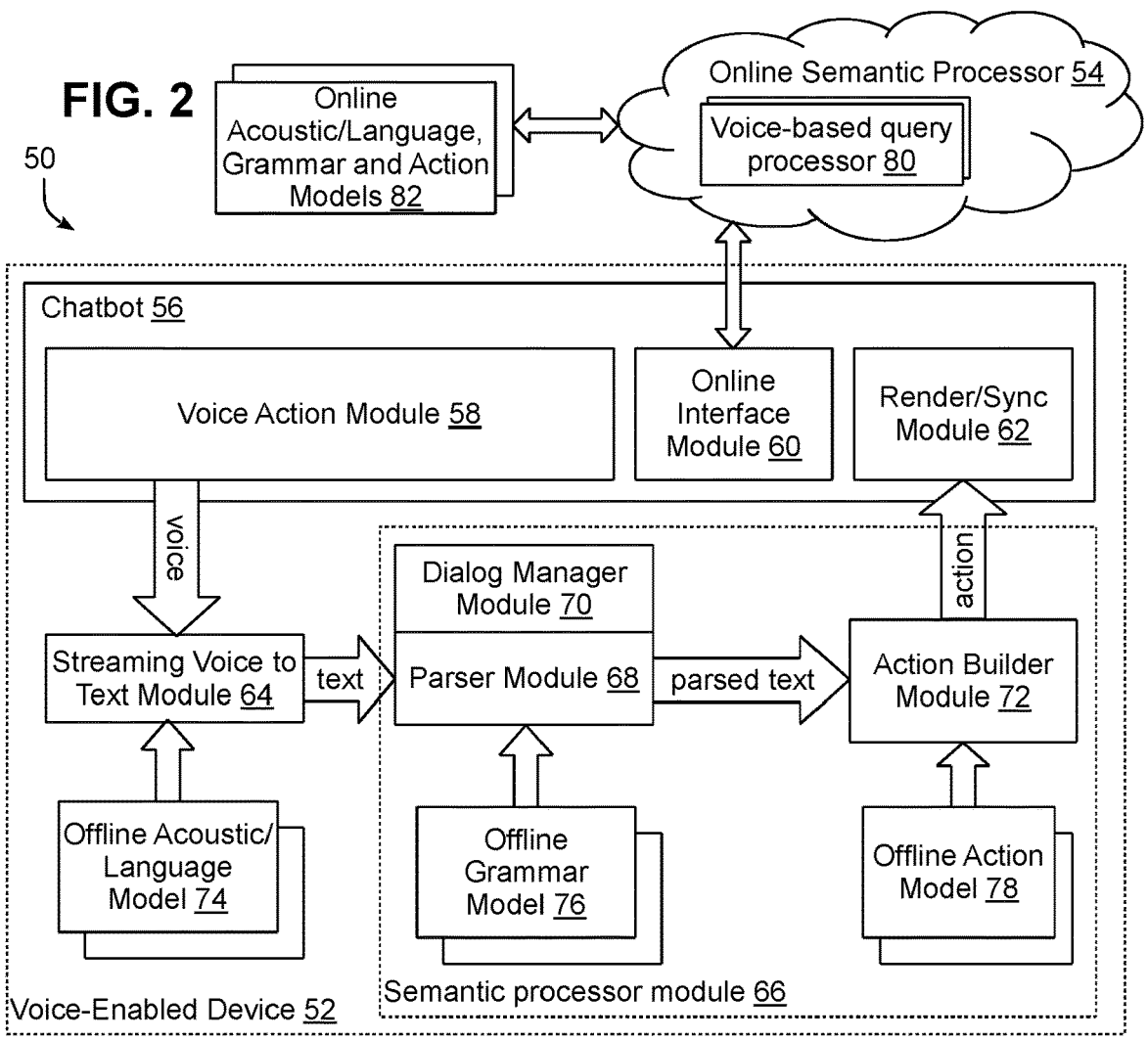
FIG. 2 is a block diagram of an example distributed voice input processing environment.

FIG. 2 illustrates an example distributed voice input processing environment 50, e.g., for use with a voice-enabled device 52 (or more generally, a "client device") in communication with an online service such as online semantic processor 54. In the implementations discussed hereinafter, for example, voice-enabled device 52 is described as a mobile device such as a cellular phone or tablet computer. Other implementations may utilize a wide variety of other voice-enabled devices, however, so the references hereinafter to mobile devices are merely for the purpose of simplifying the discussion hereinafter. Countless other types of voice-enabled devices may use the herein-described functionality, including, for example, laptop computers, watches, head-mounted devices, virtual or augmented reality devices, other wearable devices, audio/video systems, navigation systems, automotive and other vehicular systems, standalone voice-activated products, etc. Moreover, many of such voice-enabled devices may be considered to be resource-constrained in that the memory and/or processing capacities of such devices may be constrained based upon technological, economic or other reasons, particularly when compared with the capacities of online or cloud-based services that can devote virtually unlimited computing resources to individual tasks.

In some implementations, online semantic processor 54 may be implemented as a cloud-based service employing a cloud infrastructure, e.g., using a server farm or cluster of high performance computers running software suitable for handling high volumes of requests from multiple users. Online semantic processor 54 may not be limited to voice-based requests, and may also be capable of handling other types of requests, e.g., text-based requests, image-based requests, etc. In some implementations, online semantic processor 54 may handle voice-based requests such as setting alarms or reminders, managing lists, initiating communications with other users via phone, text, email, etc., or performing other actions that may be initiated via voice input. In other implementations, online semantic processor 54 may handle other types of voice inputs, such as conversational statements from a user expressing the user's state (e.g., sentiment).

In the implementation of FIG. 2, voice input received by voice-enabled device 52 is processed by a voice-enabled application (or "app"), which in FIG. 2 takes the form of a chatbot 56. In other implementations, voice input may be handled within an operating system or firmware of voice-enabled device 52. In the illustrated implementation, chatbot 56 includes a voice action module 58, online interface module 60 and render/synchronization module 62. Voice action module 58 receives voice input directed to chatbot 56 and coordinates the analysis of the voice input and performance of one or more actions for a user of the voice-enabled device 52. Online interface module 60 provides an interface with online semantic processor 54, including forwarding voice input to online semantic processor 54 and receiving responses thereto. Render/synchronization module 62 manages the rendering of a response to a user, e.g., via a visual display, spoken audio, or other feedback interface suitable for a particular voice-enabled device. In addition, in some implementations, render/synchronization module 62 also handles synchronization with online semantic processor 54, e.g., whenever a response or action affects data maintained for the user in the online search service (e.g., where voice input requests creation of an appointment that is maintained in a cloud-based calendar).

Chatbot 56 may rely on various middleware, framework, operating system and/or firmware modules to handle voice input, including, for example, a streaming voice to text module 64 and a semantic processor module 66 including a parser module 68, dialog manager module 70 and action builder module 72.

Streaming voice to text module 64 receives an audio recording of voice input, e.g., in the form of digital audio data, and converts the digital audio data into one or more textual words or phrases (also referred to herein as "tokens"). In the illustrated implementation, Streaming voice to text module 64 is also a streaming module, such that voice input is converted to text on a token-by-token basis and in real time or near-real time. In effect, tokens may be output from streaming voice to text module 64 concurrently with a user's speech, and thus prior to a user enunciating a complete spoken request. Streaming voice to text module 64 may rely on one or more locally-stored offline acoustic and/or language models 74, which together model a relationship between an audio signal and phonetic units in a language, along with word sequences in the language. In some implementations, a single model 74 may be used, while in other implementations, multiple models may be supported, e.g., to support multiple languages, multiple speakers, etc.

Whereas streaming voice to text module 64 converts speech to text, semantic processor module 66 attempts to discern the semantics or meaning of the text output by streaming voice to text module 64 (or provided initially by the user as typed text) for the purpose or formulating an appropriate response. Parser module 68, for example, relies on one or more offline grammar models 76 to map text to particular actions and to identify attributes that constrain the performance of such actions, e.g., input variables to such actions. In some implementations, a single model 76 may be used, while in other implementations, multiple models may be supported, e.g., to support different actions or action domains (i.e., collections of related actions such as communication-related actions, search-related actions, audio/visual-related actions, calendar-related actions, device control-related actions, etc.)

As an example, an offline grammar model 76 may support an action such as "set a reminder" having a reminder type parameter that specifies what type of reminder to set, an item parameter that specifies one or more items associated with the reminder, and a time parameter that specifies a time to activate the reminder and remind the user. Parser module 68 may receive a sequence of tokens such as "remind me to," "pick up," "bread," and "after work" and map the sequence of tokens to the action of setting a reminder with the reminder type parameter set to "shopping reminder," the item parameter set to "bread" and the time parameter of "5:00 pm", such that at 5:00 pm that day the user receives a reminder to "buy bread."

Parser module 68 may also work in conjunction with a dialog manager module 70 that manages dialog with a user. Dialog in this context refers to a set of voice inputs and responses similar to a conversation between two individuals. Module 70 therefore maintains a "state" of dialog to enable information obtained from a user in a prior voice input to be used when forming future outputs. Thus, for example, if a user were to say "I'm stressed," a response could be generated to say "may be it's time for a break." In some implementations, dialog manager module 70 may be implemented in whole or in part as part of chatbot 56.

Action builder module 72 receives parsed text from parser module 68, representing a voice input interpretation and generates one or more responsive actions or "tasks" along with any associated parameters for processing by module 62 of chatbot 56. Action builder module 72 may rely on one or more offline action models 78 that incorporate various rules for creating actions from parsed text. It will be appreciated that some parameters may be directly received as voice input, while some parameters may be determined in other manners, e.g., based upon a user's location, demographic information, or based upon other information particular to a user. For example, if a user were to say "remind me to pick up bread at the grocery store," a location parameter may not be determinable without additional information such as the user's current location, the user's known route between work and home, the user's regular grocery store, etc.

It will be appreciated that in some implementations, models 74, 76 and 78 may be combined into fewer models or split into additional models, as may be functionality of modules 64, 68, 70 and 72. Moreover, models 74-78 are referred to herein as offline models insofar as the models are stored locally on voice-enabled device 52 and are thus accessible offline, when device 52 is not in communication with online semantic processor 54. Moreover, while module 56 is described herein as being a chatbot, that is not meant to be limiting. In various implementations, any type of app operating on voice-enabled device 52 may perform techniques described herein to tailor output to a user's state as described herein.

In various implementations, online semantic processor 54 may include complementary functionality for handling voice input, e.g., using a voice-based query processor 80 that relies on various online acoustic/language, grammar and/or action models 82. It will be appreciated that in some implementations, particularly when voice-enabled device 52 is a resource-constrained device, voice-based query processor 80 and models 82 used thereby may implement more complex and computational resource-intensive voice processing functionality than is local to voice-enabled device 52.

In some implementations, multiple voice-based query processors 80 may be employed, each acting as an online counterpart for one or more chatbots 56. For example, in some implementations, each client device in a user's ecosystem of client devices may be configured to operate an instance of a chatbot 56 that is associated with the user (e.g., configured with the user's preferences, associated with the same interaction history, etc.). A single, user-centric online instance of voice-based query processor 80 may be accessible to each of these multiple instances of chatbot 56, depending on which client device the user is operating at the time.

In some implementations, both online and offline functionality may be supported, e.g., such that online functionality is used whenever a client device is in communication with an online service, while offline functionality is used when no connectivity exists. In other implementations, different actions or action domains may be allocated to online and offline functionality, and while in still other implementations, online functionality may be used only when offline functionality fails to adequately handle a particular voice input. In other implementations, however, no complementary online functionality may be used.

Figure 3:
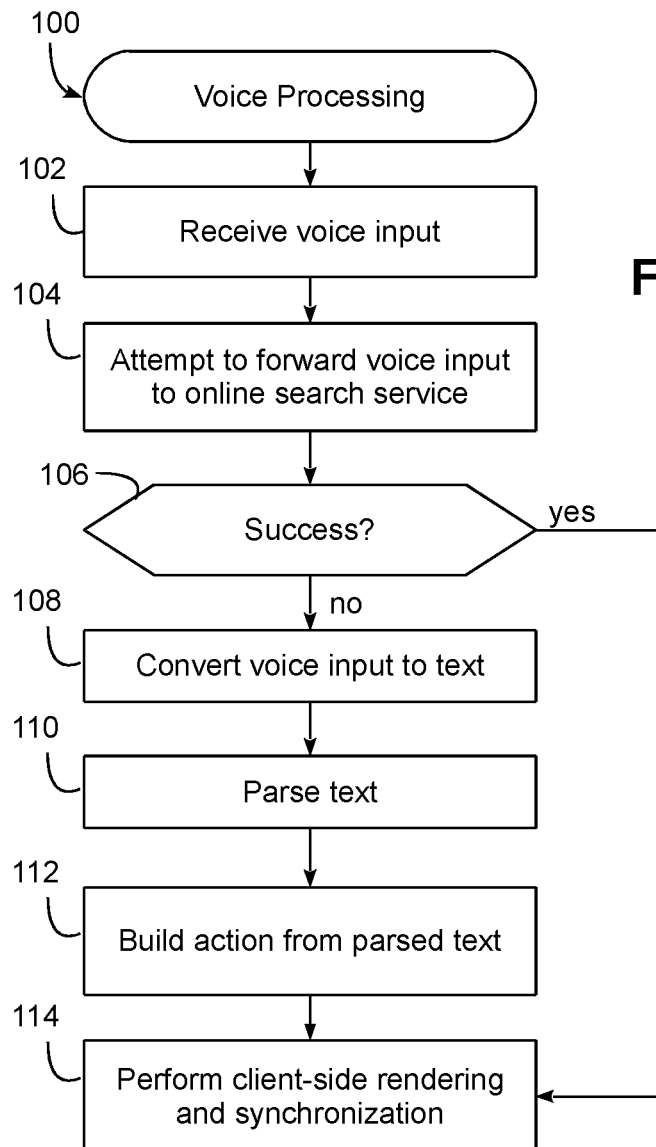
FIG. 3 is a flowchart illustrating an example method of processing a voice input using the environment of FIG. 2.

FIG. 3, for example, illustrates a voice processing routine 100 that may be executed by voice-enabled device 52 to handle a voice input. Routine 100 begins in block 102 by receiving voice input, e.g., in the form of a digital audio signal. In this implementation, an initial attempt is made to forward the voice input to the online search service (block 104). If unsuccessful, e.g., due to a lack of connectivity or a lack of a response from the online search service, block 106 passes control to block 108 to convert the voice input to text tokens (block 108, e.g., using streaming voice to text module 64 of FIG. 2), parse the text tokens (block 110, e.g., using module 68 of FIG. 2), and build an action from the parsed text (block 112, e.g., using action builder module 72 of FIG. 2). The resulting action is then used to perform client-side rendering and synchronization (block 114, e.g., using render/synchronization module 62 of FIG. 2), and processing of the voice input is complete.

Returning to block 106, if the attempt to forward the voice input to the online search service is successful, then block 106 bypasses blocks 108-112 and passes control directly to block 114 to perform client-side rendering and synchronization. Processing of the voice input is then complete. It will be appreciated that in other implementations, as noted above, offline processing may be attempted prior to online processing, e.g., to avoid unnecessary data communications when a voice input can be handled locally.

Figure 4:
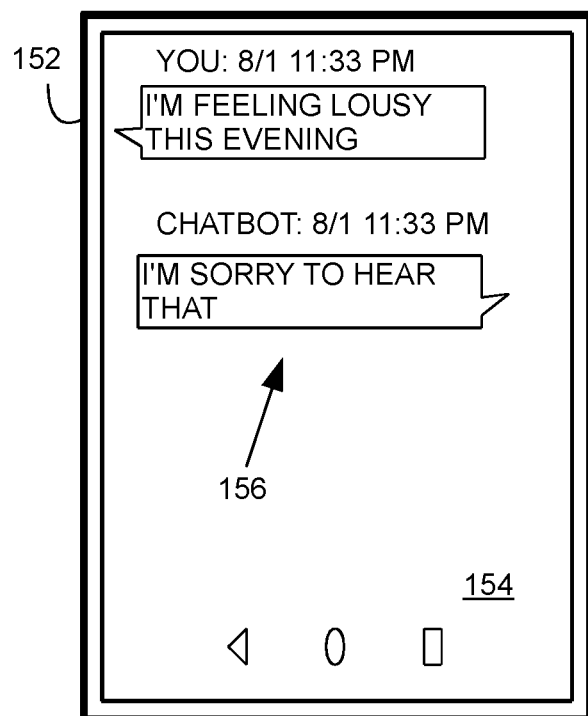
FIG. 4 and FIG. 5 illustrate examples of how disclosed techniques may be implemented in an example scenario, in accordance with various implementations.
Figure 5:
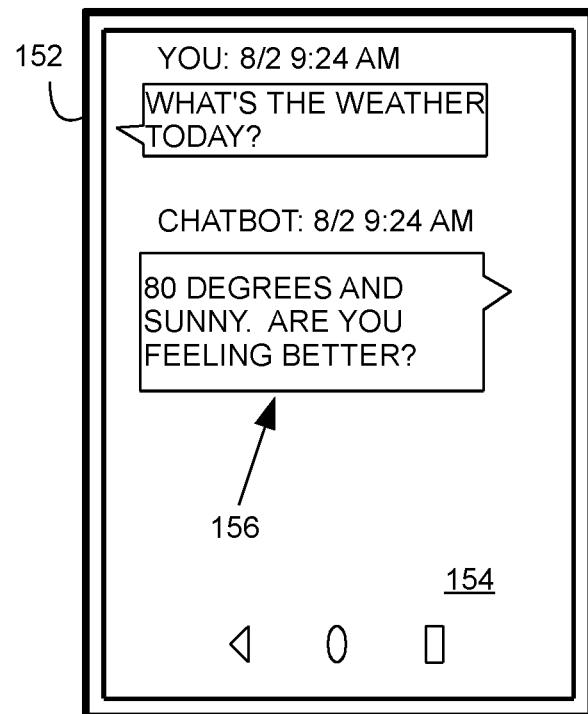

FIGS. 4 and 5 schematically demonstrate an example scenario in which chatbot 56 may track a user's state (e.g. sentiment) across multiple sessions and output a statement formed based on the user's last known state. In FIG. 4, a voice-enabled device 152 takes the form of a smart phone or tablet computer with a touch screen display 154 that is used to render a transcript 156 of a dialog between a user ("YOU" in FIGS. 4 and 5) and a chatbot (56 in FIG. 2). FIG. 4 depicts a first session between the user and the chatbot that occurs late in the evening of August $1^{st}$. The user has provided textual input (originally spoken or typed) indicating that the user feels lousy. The chatbot has detected the negative user state and has provided a suitable response, such as "I'm sorry to hear that." The chatbot has also stored an indication of the user's expressed state in memory, e.g., of voice-enabled device 152. For example, in some implementations, the chatbot may store the user's statement verbatim in memory. In other implementations, the chatbot may determine a generic user state (e.g., a numeric sentiment measure or enumerated sentiment level) determined from the user's statement, such as "sick," "sad," "depressed," etc., and may store an indication of that generic user state.

FIG. 5 depicts a second session between the user and the chatbot that occurs the next morning on August $2^{nd}$. The user initiates the second session by asking, "What's the weather today?" The chatbot first responds to the user's query by replying, "80 degrees and sunny." Then, without any prompting from the user, and based on the user's negative state expressed the previous evening, the chatbot asks, "Are you feeling better?" While the second session depicted in FIG. 5 occurs one day after the first session depicted in FIG. 4, this is not meant to be limiting. As noted above, in various implementations, separate sessions between the user and the chatbot may be distinguished from each other based on other signals, such as intervening interactions between the user and voice-enabled device 152, a change of context of the user (which may be detected, for instance, based on one or more signals from one or more sensors associated with voice-enabled device 152, such as accelerometers, GPS, etc.), and so forth.

Figure 6:
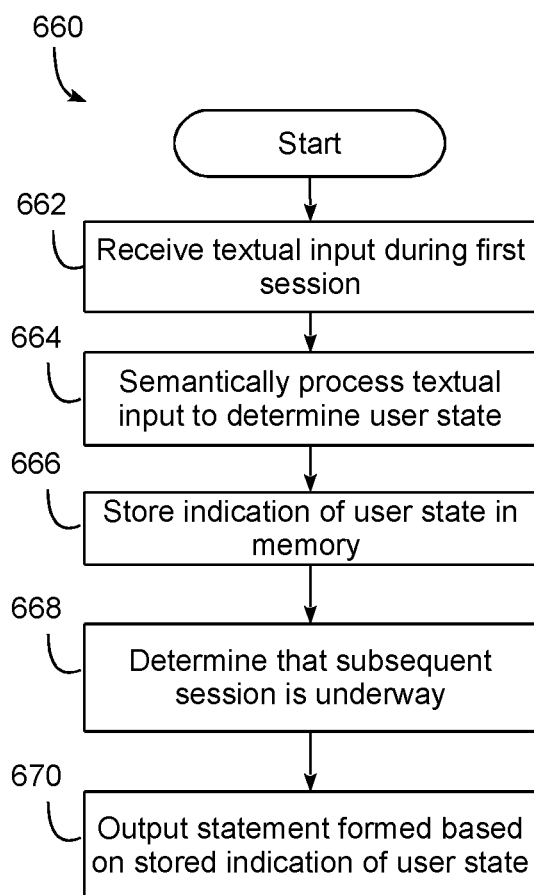
FIG. 6 is a flowchart illustrating an example method performable by and/or on behalf of a chatbot, in accordance with various implementations.

FIG. 6 illustrates a routine 660 suitable for execution by a chatbot 56 to communicate with a user in a more natural (i.e. "human," "graceful") manner. Routine 660 may be executed by the same service that processes voice-based queries, or may be a different service altogether.

At block 662, input is received from a user during a first session. As noted above, the input may take various forms and/or be received using various input modalities. In some implementations, the input may take the form of a digital audio signal or text typed by the user at a physical or virtual keyboard. In other implementations, the input may take other forms, such as gestures (e.g., shaking a phone may indicate excitement or frustration), eye movements (e.g., a lot of eye movement may indicate stress or excitement), and so forth. Assuming the input is textual input (originally spoken or typed), at block 664, the user input may be semantically processed online or offline to determine a state of the user. In some implementations, the textual input may be converted to text tokens (e.g., using streaming voice to text module 64 and/or model 82 of FIG. 2) and then semantically processed at block 664.

At block 666, chatbot 56 may store, e.g., in local memory and/or at one or more remote computing devices (e.g., hosted in the cloud), an indication of the user's state. In some implementations, the indication may include the user's statement verbatim. In other implementations, the indication may include a generalized label of the user's state (e.g., "happy," "sad," "sick," "excited," "stressed," etc.). In yet other implementations, the indication may be stored as a numeric state (or "sentiment") measure. In some implementations, the user input may be stored as part of a sequence of user inputs that express states of the user over time (e.g., across a plurality of distinct sessions). At block 668, chatbot 56 may determine based on one or more signals that a subsequent session has commenced and/or is underway. Examples of signals that may be considered by chatbot 56 when distinguishing between multiple distinct sessions were described previously.

At block 670, chatbot 56 may output one or more statements that are formed, e.g., by chatbot 56 or by a remote processor, from a plurality of candidate words, phrases, and/or statements. In some implementations, the plurality of candidate words, phrases, and/or statements may be obtained/extracted from prior message exchange threads between multiple individuals. For example, a corpus of prior message exchange threads may be authorized for use in training an artificial intelligence scheme such as a machine learning classifier or neural network. User words, phrases, and/or statements in the message exchange threads expressing states of the users (e.g., user sentiments) may be used as labeled inputs. Responses to those statements from other users in the message exchange threads may be provided as labeled outputs. For example, responses of empathy, congratulations, encouragement, etc., may be identified as responses to user statements expressing sentiment. A machine learning classifier, neural network, or other artificial intelligence model may be trained using these labeled pairs to identify future words, phrases, and/or statements to be formed and provided by chatbot 56 in response to user statements of sentiment.

In other implementations, less complex techniques may be employed to identify suitable statements for chatbot 56 to output in subsequent sessions. For example, in some implementations, a plurality of candidate statements may be provided for each of an enumerated set of user states (e.g., sentiments). Whenever a new session commences between chatbot 56 and a user, the user's last known state (or a combination of a plurality of previous states) may be used to identify the user's potential current sentiment. Then, a statement may be selected from a plurality of candidate statements associated with that sentiment.

Figure 7:
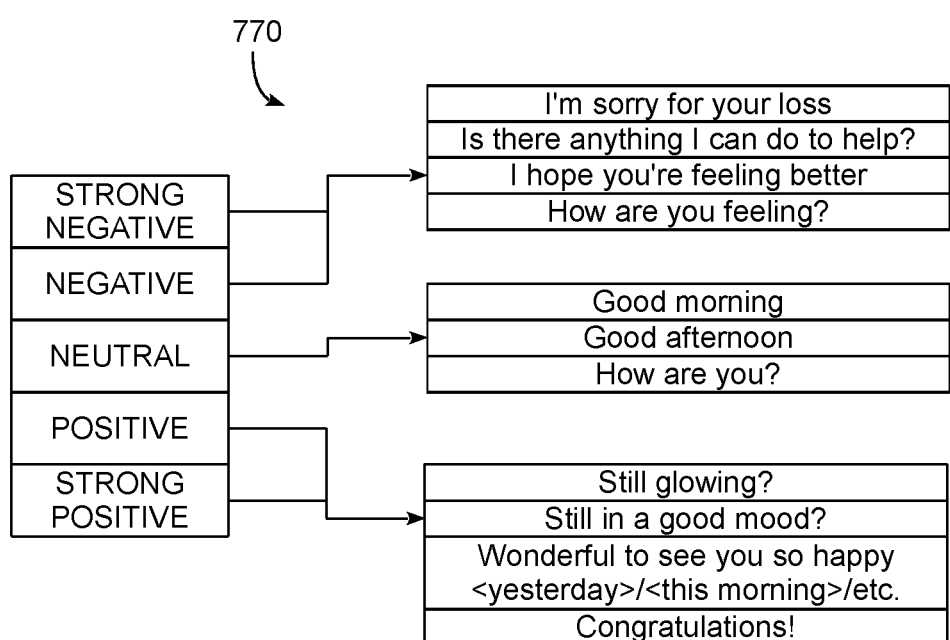
FIG. 7 is an example of how user states may be mapped to groups of statements, in accordance with various implementations.

FIG. 7 schematically depicts a non-limiting example of how various levels of user state, and more particularly, user sentiment, may be mapped to a plurality of candidate statements to be output by a chatbot. On the left is a range of sentiments from strong negative to strong positive, with intermediate values in between, that may be determined by a chatbot based on user input during a first session. On the right are candidate statements that may be selected and output by a chatbot during a subsequent session with the user based on the previously-determined sentiment. In other implementations, in addition to or instead of selecting a candidate statement to output, a chatbot may form (e.g., assemble) a statement from a plurality of candidate words, phrases, and/or complete statements.

In the implementation depicted in FIG. 7, each level of sentiment may map to a plurality of candidate statements. For example, both strong negative and negative map towards the same group of four candidate statements ("I'm sorry for your loss," "Is there anything I can do to help?," "I hope you're feeling better," "How are you feeling?"). Neutral maps to three relatively generic candidate statements that take the form of common greetings ("Good morning," "Good Afternoon," "How are you?"). Positive and strong positive both map to another group of four candidate statements ("Still glowing?," "Still in a good mood?," "Wonderful to see you so happy <insert previous time>," "Congratulations"). Of course, the sentiment levels and candidate statements depicted in FIG. 7 are for illustrative purposes only, and are not meant to be limiting. Any number of candidate statements may be provided for any number of sentiment levels.

In various implementations, if a chatbot (e.g., 56) determines during a first session with a user that the user has a particular sentiment, the chatbot may output a statement during a subsequent session, such as the next session, that corresponds to the prior sentiment. For example, if a user expresses a negative sentiment during a first session, the chatbot may select and output one of the four statements in the top group of statements. As noted above, in other implementations, the chatbot may form (e.g., assemble) statements to output from a plurality of candidate words, phrases, and/or statements. Additionally or alternatively, in some implementations, the chatbot may select and output one or more images, symbols, and/or ideograms (such as one or more so-called "emojis") to convey empathy or otherwise respond to a user's expressed sentiment.

Referring back to FIG. 7, the chatbot may select a particular statement from a group of candidate statements mapped to one or more sentiment levels in various ways. In some implementations, if the chatbot lacks additional information about the context of the user, etc., the chatbot may merely select the statement that is the most broadly applicable (i.e., generic). For example, if the chatbot only knows that the user's last sentiment was negative, it may select a relatively generic empathetic response, such as "I hope you're feeling better" or "How are you feeling?" In some implementations, if two or more candidate statements are equally applicable to a user's last-known sentiment, the chatbot may randomly select from the two or more statements.

In other implementations, the chatbot may analyze prior responses by the user to the candidate statements, and may select the candidate statement to which the user has responded to mostly positively in the past. For example, suppose in multiple instances in the past when a user last-known sentiment is negative, the chatbot has output both "I hope you're feeling better" (a declarative statement) and "How are you feeling?" (solicitation of a user state). Suppose further that the user ignored the former but responded to the latter (e.g., "Yes, I am feeling better, thank you for asking"). The chatbot may take this into account when selecting which of these two phrases to output in future sessions. To this end, in some implementations, the chatbot may create and maintain scores, statistics, and/or other metrics in association with each candidate statement, so that those statements that elicit positive responses are used more often.

In some implementations, candidate statements (or words, or phrases) may be drawn from prior message exchange between multiple (human) participants that have been authorized for use as training examples, e.g., for machine learning classifiers. For example, a so-called "sentiment classifier" trained to identify user statements expressing sentiment may be employed to identify words, phrases, and/or statements by message exchange thread participants expressing various sentiments. Responses and/or replies from other participants may then be identified.

In some implementations, pairs of statements, one expressing sentiment and another empathetically responding thereto, may be used as positive training examples for a so-called "sentiment response classifier." Additionally or alternatively, in some implementations, triplets of statements—e.g., a first statement expressing sentiment, a second statement empathetically responding to the first statement, and a third statement positively acknowledging the second statement—may be used as a positive training example. Likewise, in some implementations, triplets of statements—e.g., a first statement expressing sentiment, a second statement empathetically responding to the first statement, and a third statement rejecting or otherwise correcting the second statement—may be used as a negative training example. Once sufficient prior message exchange threads have been analyzed in this fashion, the sentiment response classifier may be used by a chatbot to select candidate words, phrases, and/or statements for use as output in response to previously-determined user sentiments.

In yet other implementations, statements may be formed based on one or more signals available to the chatbot other than a general indication prior user sentiment. For example, suppose user input expressing negative sentiment also provides other details, such as "I'm sad because my friend moved away." The additional information about the friend moving away may be semantically processed, e.g., by the chatbot, and may be used to select "I'm sorry for your loss" from the top group of statements in FIG. 7.

As another example, suppose that during a first session, a user expresses positive sentiment to the chatbot but does not elaborate on why they are happy. However, suppose the chatbot has access to personal data associated with the user, such as a calendar entry describing a ceremony at which the user is going to receive an award, a social networking status update indicating the user has become engaged, or an email notifying the user that the user has won a free vacation. Based on any of these data points (or other similar types of data points that might warrant congratulations), the chatbot may select "Congratulations" to be output to the user at a subsequent session, rather than a more generic statement such as "Still in a good mood?"

The examples described above in association with FIG. 7 include maintaining or tracking user sentiment intersession (i.e. across multiple sessions). However, this is not meant to be limiting. In some implementations, similar techniques may be employed intra-session (i.e. within a single session). For example, if a user provides input that expresses a negative/positive sentiment, the chatbot may immediately respond with a statement selected from the candidate statements depicted in FIG. 7 (or in other implementations may assemble/form such a statement using candidate words, phrases, and/or statements). The chatbot may also score or otherwise rank the candidate statements based on the user's immediate response or lack thereof, e.g., for future reference. In some implementations, a user may, during a given session, express a prior state (e.g., "I felt sick last night"). In response to such a statement about a prior state, the chatbot may, during the same given session, form a response from a plurality of candidate words, phrases, and/or statements (e.g., "are you feeling better this morning?").

In some implementations, techniques described herein may be employed without knowledge of a user's prior state (e.g., sentiment). For example, if a chatbot were to output a generic greeting ("e.g., "Hello," "How are you," etc.) to a user each time a new session between the user and the chatbot commenced, the user may become annoyed, particularly if there are multiple sessions within a relatively short period of time (e.g., a few minutes, a couple of hours, etc.). For example, if a chatbot already output the greeting "Good morning" to a user, it would not make sense for the chatbot to output the same greeting later that morning, even if the user engages in multiple distinct sessions with the chatbot.

Accordingly, techniques similar to those described above in association with block 668 of FIG. 6 may be employed to determine whether it would be socially reasonable for a chatbot to issue a greeting to a user on commencement of a session. In the above example, for instance, the chatbot may maintain, e.g., in memory of voice-enabled device 52, an indication that the greeting "Good morning" has already been output today. Should a morning session between the user and the chatbot cease, and then should the user initiate a new session later in the morning, the chatbot may determine that it already greeted the user, and may refrain from issuing the same or similar greeting again. In some implementations, a chatbot may be configured to output only a single greeting per day. In other implementations, a chatbot may be configured to output a greeting if a threshold amount of time has elapsed since it last output a greeting.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors and comprising:

detecting, at a first client device that executes a first portion of a virtual assistant, by one or more input devices of the first client device, one or more physical actions of a user, wherein the one or more physical actions are detected during a first session between the user and the virtual assistant;

analyzing, by the virtual assistant, one or more attributes of the one or more physical actions of the user to determine a state of the user during the first session;

storing, by the virtual assistant in memory hosted on a cloud infrastructure that is accessible to at least the first client device, an indication of the state of the user determined during the first session for future use by the virtual assistant;

determining, by the virtual assistant based on one or more signals, that a second session between the user and the virtual assistant that is distinct from the first session is underway;

forming, by a second portion of the virtual assistant that executes on the cloud infrastructure, based on the stored indication of the state of the user, a natural language output, wherein the natural language output is associated with the state of the user determined during the first session; and outputting, by the virtual assistant via one or more output devices of the first client device or a second client device, as part of the second session, the natural language output.

2. The method of claim 1, wherein the state of the user comprises a physical condition of the user.

3. The method of claim 1, wherein the state of the user is a negative sentiment, and the natural language output comprises an inquiry of whether the user has improved.

4. The method of claim 1, wherein the one or more physical actions of the user comprise a facial expression.

5. The method of claim 1, wherein the one or more physical actions of the user comprise a gesture made by the user.

6. The method of claim 1, wherein the one or more signals further include detection of one or more intervening interactions between the user and the first client device other than dialog between the user and the virtual assistant.

7. The method of claim 1, wherein the one or more signals further include passage of a predetermined time interval since a last interaction between the user and the virtual assistant.

8. The method of claim 1, wherein the one or more signals further include detection of a change in a context of the user since a last interaction between the user and the virtual assistant.

9. A system comprising one or more processors and memory storing instructions that, in response to execution of the instructions by the one or more processors, cause the one or more processors to perform the following operations:

detecting, at a first client device that executes a first portion of a virtual assistant, by one or more input devices of the first client device, one or more physical actions of a user, wherein the one or more physical actions are detected during a first session between the user and the virtual assistant;

analyzing, by the virtual assistant, one or more attributes of the one or more physical actions of the user to determine a state of the user during the first session;

storing, by the virtual assistant in memory hosted on a cloud infrastructure that is accessible to at least the first client device, an indication of the state of the user determined during the first session for future use by the virtual assistant;

determining, by the virtual assistant based on one or more signals, that a second session between the user and the virtual assistant that is distinct from the first session is underway;

forming, by a second portion of the virtual assistant that executes on the cloud infrastructure, based on the stored indication of the state of the user, a natural language output, wherein the natural language output is associated with the state of the user determined during the first session; and outputting, by the virtual assistant via one or more output devices of the first client device or a second client device, as part of the second session, the natural language output.

10. The system of claim 9, wherein the state of the user comprises a physical condition of the user.

11. The system of claim 9, wherein the state of the user is a negative sentiment, and the natural language output comprises an inquiry of whether the user has improved.

12. The system of claim 9, wherein the one or more physical actions of the user comprise a facial expression.

13. The system of claim 9, wherein the one or more physical actions of the user comprise a gesture made by the user.

14. The system of claim 9, wherein the one or more signals further include detection of one or more intervening interactions between the user and the first client device other than dialog between the user and the virtual assistant.

15. The system of claim 9, wherein the one or more signals further include passage of a predetermined time interval since a last interaction between the user and the virtual assistant.

16. The system of claim 9, wherein the one or more signals further include detection of a change in a context of the user since a last interaction between the user and the virtual assistant.

17. At least one non-transitory computer-readable medium comprising instructions that, in response to execution of the instructions by one or more processors, cause the one or more processors to perform the following operations:

detecting, at a first client device that executes a first portion of a virtual assistant, by one or more input devices of the first client device, one or more physical actions of a user, wherein the one or more physical actions are detected during a first session between the user and the virtual assistant;

analyzing, by the virtual assistant, one or more attributes of the one or more physical actions of the user to determine a state of the user during the first session;

storing, by the virtual assistant in memory hosted on a cloud infrastructure that is accessible to at least the first client device, an indication of the state of the user determined during the first session for future use by the virtual assistant;

determining, by the virtual assistant based on one or more signals, that a second session between the user and the virtual assistant that is distinct from the first session is underway;

forming, by a second portion of the virtual assistant that executes on the cloud infrastructure, based on the stored indication of the state of the user, a natural language output, wherein the natural language output is associated with the state of the user determined during the first session; and outputting, by the virtual assistant via one or more output devices of the first client device or a second client device, as part of the second session, the natural language output.

18. The at least one non-transitory computer-readable medium of claim 17, wherein the state of the user comprises a physical condition of the user.

19. The at least one non-transitory computer-readable medium of claim 17, wherein the one or more physical actions of the user comprise a facial expression.

20. The at least one non-transitory computer-readable medium of claim 17, wherein the one or more physical actions of the user comprise a gesture made by the user.

* * * * *